United States Patent
Wu et al.

[11] Patent Number: 6,158,751
[45] Date of Patent: Dec. 12, 2000

[54] SKATING BOARD FOLDING STRUCTURE

[76] Inventors: Jhin-Yang Wu, No. 26, Lane 169, Hai Chung St., Tainan; Chin-Fa Li, No. 86-31, Chiang Kuei, Chiang Kuei Village, Chiang Chun Hsiang, Tainan Hsien, both of Taiwan

[21] Appl. No.: 09/534,475

[22] Filed: Mar. 24, 2000

[51] Int. Cl.⁷ .................................................. B62B 3/02
[52] U.S. Cl. .................................. 280/87.041; 280/87.05
[58] Field of Search ........................ 280/87.041, 87.05, 280/206, 638, 639, 641, 51; 180/180, 181

[56] References Cited

U.S. PATENT DOCUMENTS

| | | | |
|---|---|---|---|
| 4,707,884 | 11/1987 | Chang | 280/87.041 |
| 4,775,162 | 10/1988 | Chao | 280/87.041 |
| 5,848,660 | 12/1998 | McGreen | 280/87.05 |

FOREIGN PATENT DOCUMENTS

| | | | |
|---|---|---|---|
| 139444 | 3/1920 | United Kingdom | 280/87.05 |
| 225781 | 12/1924 | United Kingdom | 280/87.05 |

Primary Examiner—Richard M. Camby
Attorney, Agent, or Firm—Rosenberg, Klein & Lee

[57] ABSTRACT

A folding structure for skating board is essentially comprised of a handle and a handle stem both connected to the head tube of the skating board, a support extending from the head tube at a certain inclination is pivoted to a pivot seat protruding from the board. Wherein, a sliding chute in proper length is provided on the support, and a tag extending from the pivot seat so that a joint permitting fast removal radially inserted through the tag and the sliding chute is used to secure the support and the pivot seat. Once the fast joint is released, and the support is turned at a certain inclination, the support may be drawn out and sliding relatively to the pivot seat so to fold both of the handle and its stem flat on the board.

2 Claims, 10 Drawing Sheets

A-A

B-B

SKATING BOARD FOLDING STRUCTURE

BACKGROUND OF THE INVENTION (a) Field of the Invention

The present invention is related to a folding structure for a skating board or a scooter, and more particularly to one that folds up of the skating board for easy carrying or storage.

(b) Description of the Prior Art

Whereas, the skating board is very popular as a hobby, sports and even as a walking means. The skating board generally available in the market is essentially comprised of a frame of metal tubes, a head tube extending upward from the front end of the frame, two wheels respectively provided at the front end and the rear end of the frame, and a lateral board over the frame. In practicing, one has to have one of his feet standing on the board to control the direction of the head tube while using his another foot to push forward the board. However, the comparatively large size of the structure prevents it from being folded up for storage or carrying purpose. An improvement is made by providing a connection seat at the end of the board, a joint frame with axial hole and pores extending from the base of the handle, and a king bolt penetrating through the connection seat and the joint frame to form an axial position for the former. A corresponding arc track chute is provided on the connection seat, and a multiple catch chutes are provided at where appropriately in the arc tract chute. A catch pillar for positioning purpose is inserted through the arc tract chute corresponding to the axial hole, and a return spring is separately provided with its both ends respectively holding against the king bolt and the middle section of the catch pillar. By taking advantage of the flexible pull from the return spring, the catch pillar maintains in position when restricted in the catch chute in normal status, and once the catch pillar is released from the catch chute, the catch pillar having the king bolt as the center slides upward or downward along the arc track chute. The catch pillar is buckled in a proper catch chute by means of the return spring to allow the skate board be in standing position or folded up for storage.

The prior art of the folding structure is found with certain defects on the return spring. The positioning of the prior art essentially relies upon the pull from the return spring to constantly pull the catch pillar in the catch pillar chute. In general, after a certain period of normal use, the spring develops flexibility fatigue. Such fatigue could get even more significant on considering that the skating board is always under drastic vibration. The fatigue then results in the insufficient positioning when loosening takes place between the handle and the board. As a result, the joint frame at the base of the handle and the connection seat at the end of the board are vulnerable to accidental fall-off.

SUMMARY OF THE INVENTION

The primary purpose of the present invention is to provide a folding structure for a skating board essentially comprised of a handle stem and a handle connected to the head tube, a front wheel connected to the base of the head tube, a support connected to the board extending at a certain inclination from the peripheral of the head tube, a rear wheel connected to the rear of the board, and a folding knuckle provided between the head tube and the board. Wherein, the folding knuckle is formed by the support pivoted to the pivot seat protruding from the board. A sliding chute in proper length is provided on the surface of the support and a tag is provided by extending from the pivot seat on the end surface of the board. Both of the support and the pivot seat are secured to each other by having a joint allowing fast release to be radially inserted through the tag and pivoted in the sliding chute. Upon removing, the fast joint is released first to permit the support to be drawn and sliding against the pivot base for a proper height, then the support is turned for a certain inclination and the handle stem provided on the support is folded up against the board.

DETAILED DESCRIPTION OF THE PREFERRED EMBODIMENTS

Figure 1:
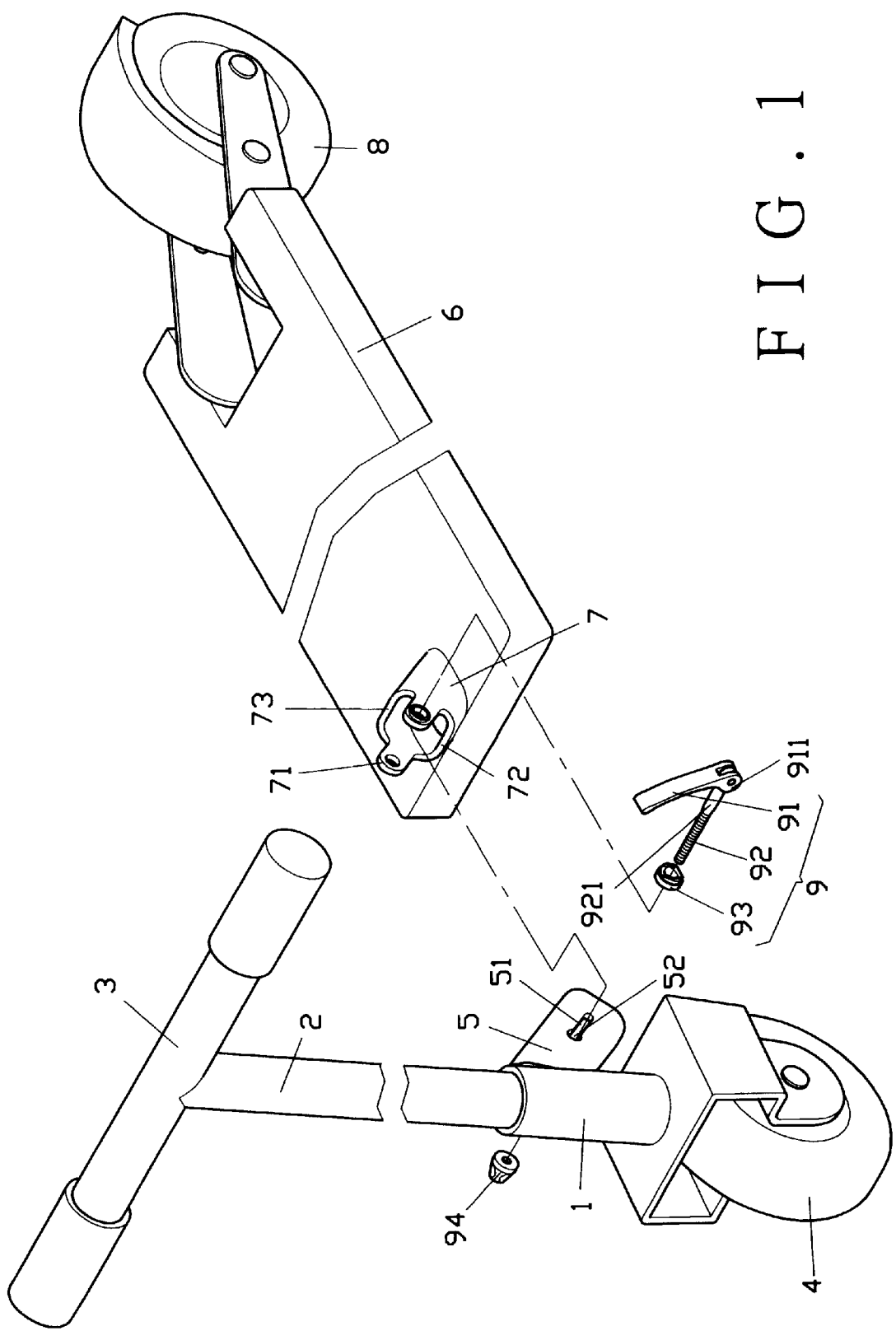
FIG. 1 is an exploded view of the present invention.
Figure 2:
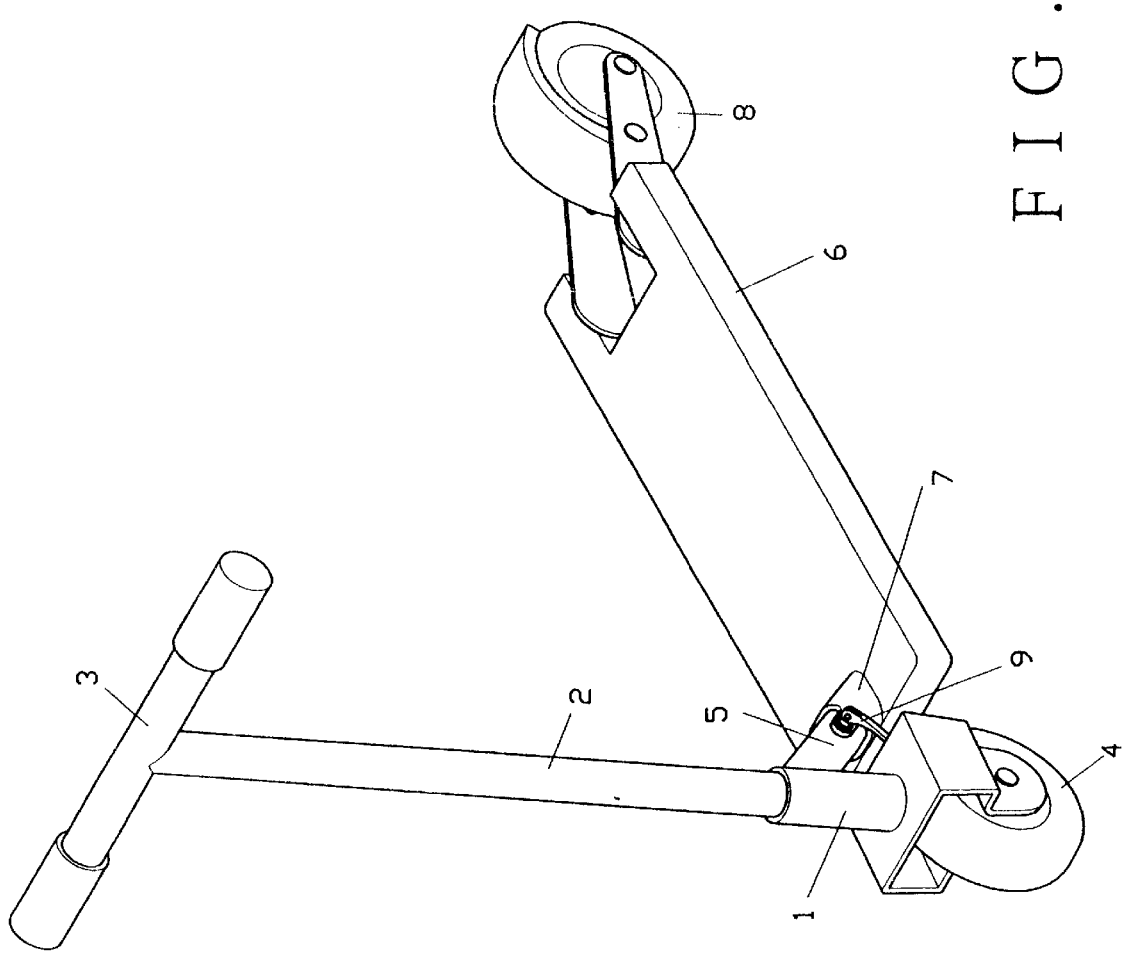
FIG. 2 shows the view of the structure of the present invention as assembled.

As illustrated in FIGS. 1 and 2, the present invention is essentially comprised of a handle stem (2) and a handle (3) both connected to the upper head tube (1), a front wheel (4) provided at the end, a support (5) extending at a certain inclination from the peripheral of the head tube (1), a pivot seat (7) connected to the support (5) provided on the front end of the board (6), and a rear wheel (8) provided at the rear end of the board (6) Wherein, a folding knuckle is formed by the support (5) and the pivot seat (7) at the front end of the board (6) simply by insertion and pivoting. A sliding chute (51) is provided on the surface of the support (5). One end of the sliding chute (51) is provided with a positioning hole (52). The pivot seat (7) on the front end of the board (6) is formed at a certain inclination so to form a hollow space for insertion in relation to the shape of the support (5). Two tags (71) are respectively protruding from one edge of the pivot seat (7) with a lower wall (72) and a taller wall (73) are formed respectively at the front and the rear end edges by the side of the tag (71). Furthermore, both of the support (5) and the pivot seat (7) are connected to each other with a joint (9) allowing fast release between the tag (71) and the sliding chute (51). The joint (9) is connected through an arc seat (93) with a wrench (91) pivoted to a fixation lever (92). The section of the fixation lever (92) at where close to the wrench (91) is pressed to a form a flat portion (921) which is wider than the sliding chute and slightly smaller than the positioning hole (52). The flat portion (921) is used to connect the support (5) and the pivot seat (7) so that the flat portion (921) is relatively extended to rest either in the sliding chute (51) or the positioning hole (52). A fixation nut (94) is provided on the other end of the fixation lever (92) penetrating through the tag (71). A cam plane (911) is formed at the pivoted end of the wrench (91) to hold against the arc seat (93).

Figure 3:
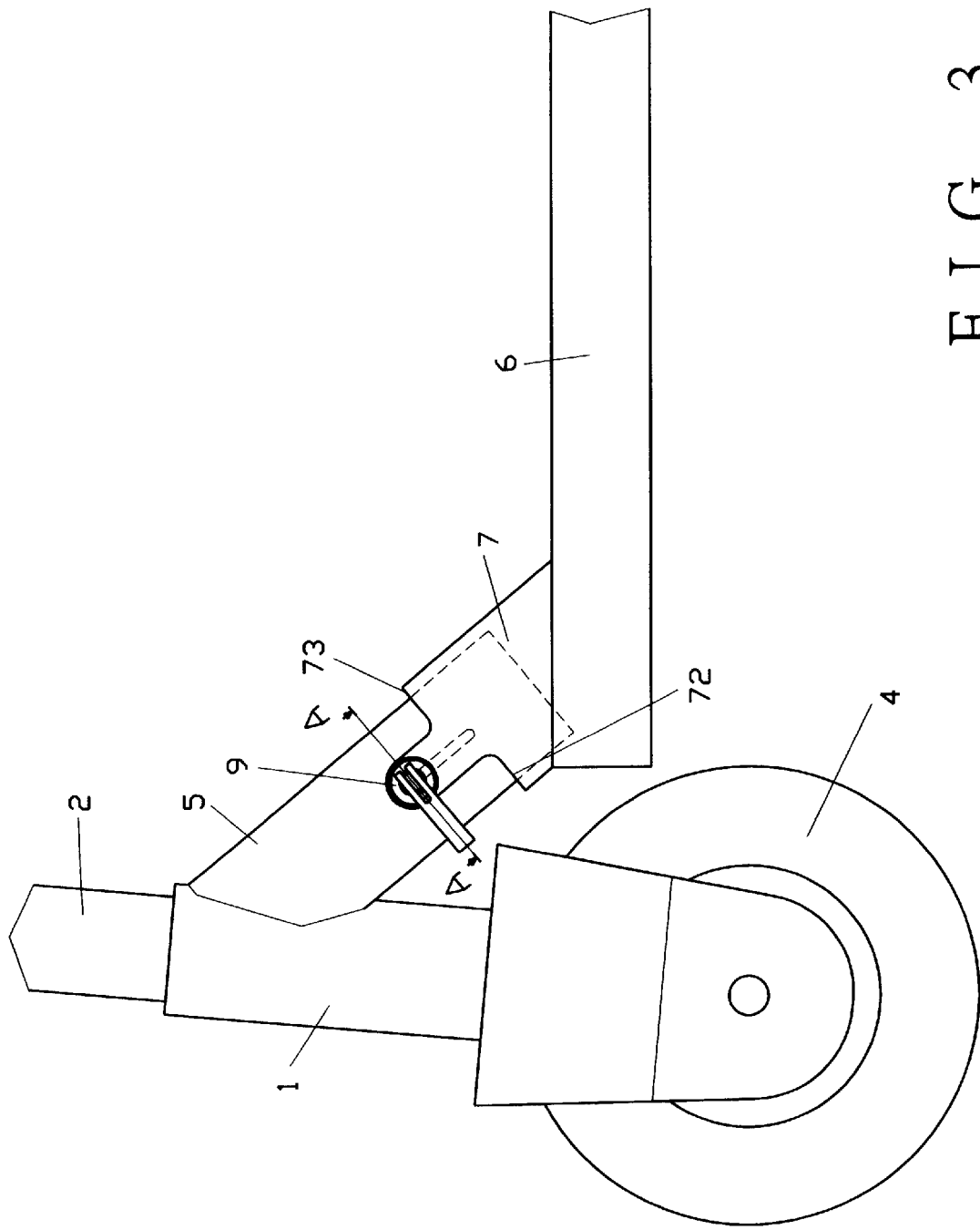
FIG. 3 is a view showing the assembly of the folding knuckle of the present invention.
Figure 4:
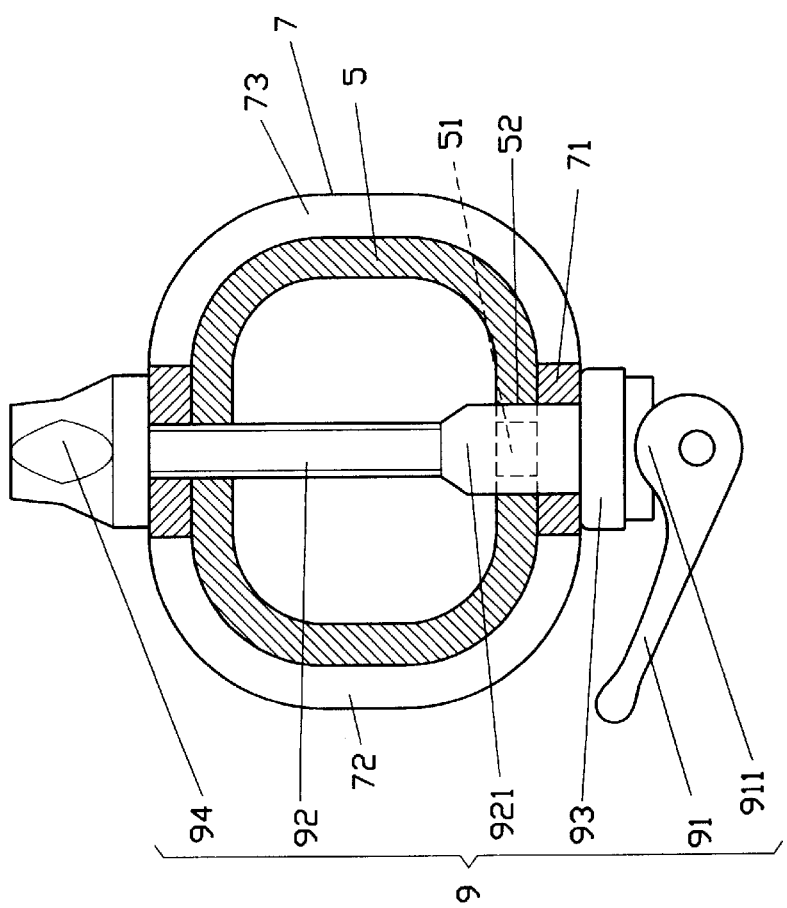
FIG. 4 is a sectional view taken from A—A of the folding knuckle illustrated in FIG. 3.

Referring to FIGS. 3 and 4, when the structure is assembled and is held in position by the pivot seat (7) and the support (5). The support (5) is inserted at a certain inclination into the pivot seat (7) while the fixation lever (92) of the joint (9) longitudinally slides with its flat portion (921) into the sliding chute (51). The joint (9) is turned when the fixation lever (92) is approaching the positioning hole (52) for the flat portion (921) of the fixation lever (92) to turn laterally to hold into the positioning hole (52). Whereas the flat portion (921) is wider than the sliding chute (51), it is prevented from further advancement along the sliding chute (51). Meanwhile, the wrench (91) of the joint (9) is pressed to push its cam plane (911) along the arc seat (93) so to pull the fixation lever (92) thus to form double secure by insertion and fastening in conjunction with the fixation nut (94) pressing against the tag (71) of the pivot seat (7) and the sliding chute (51) of the support (5).

Figure 5:
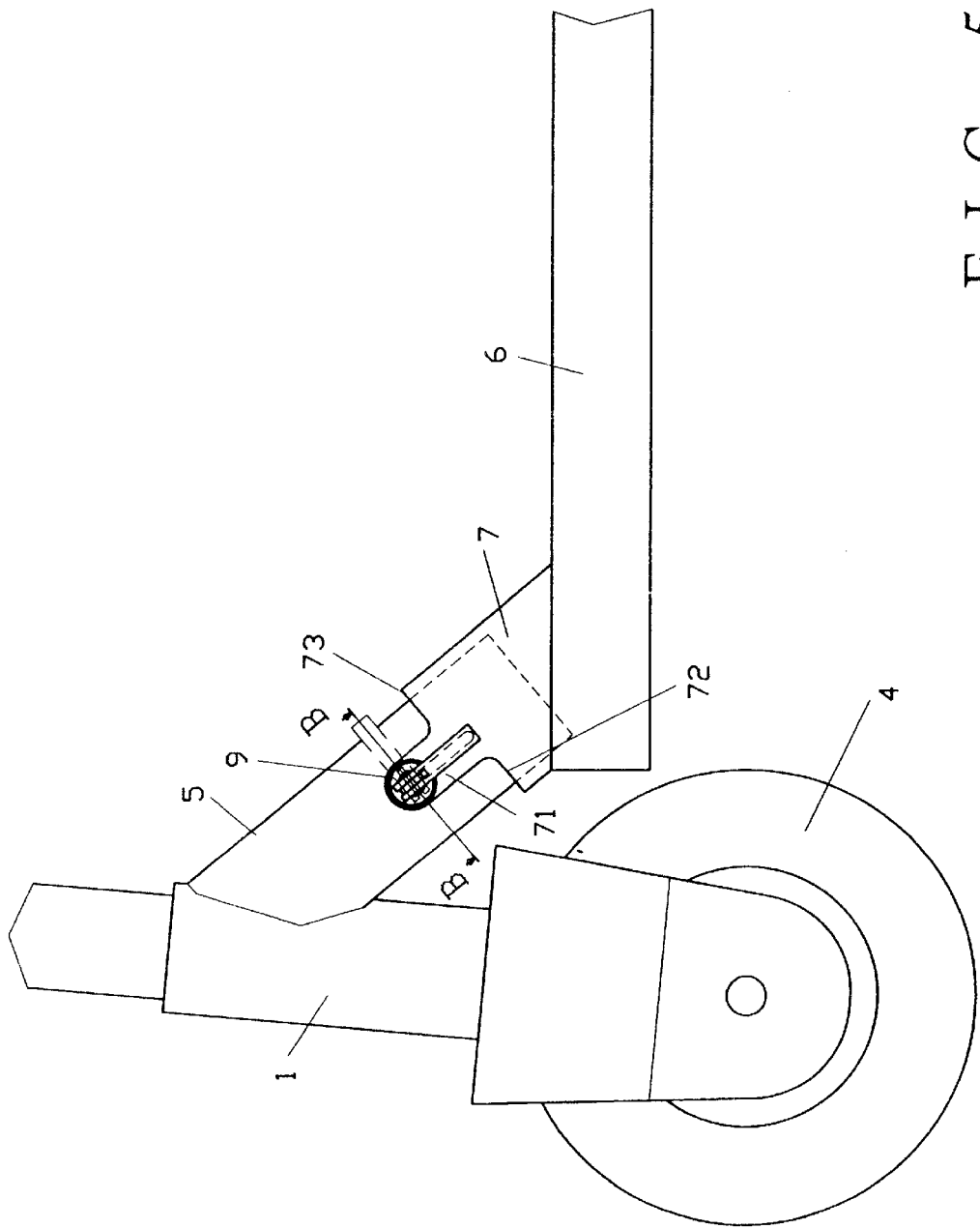
FIG. 5 is a schematic view showing the action of the folding knuckle present invention.
Figure 6:
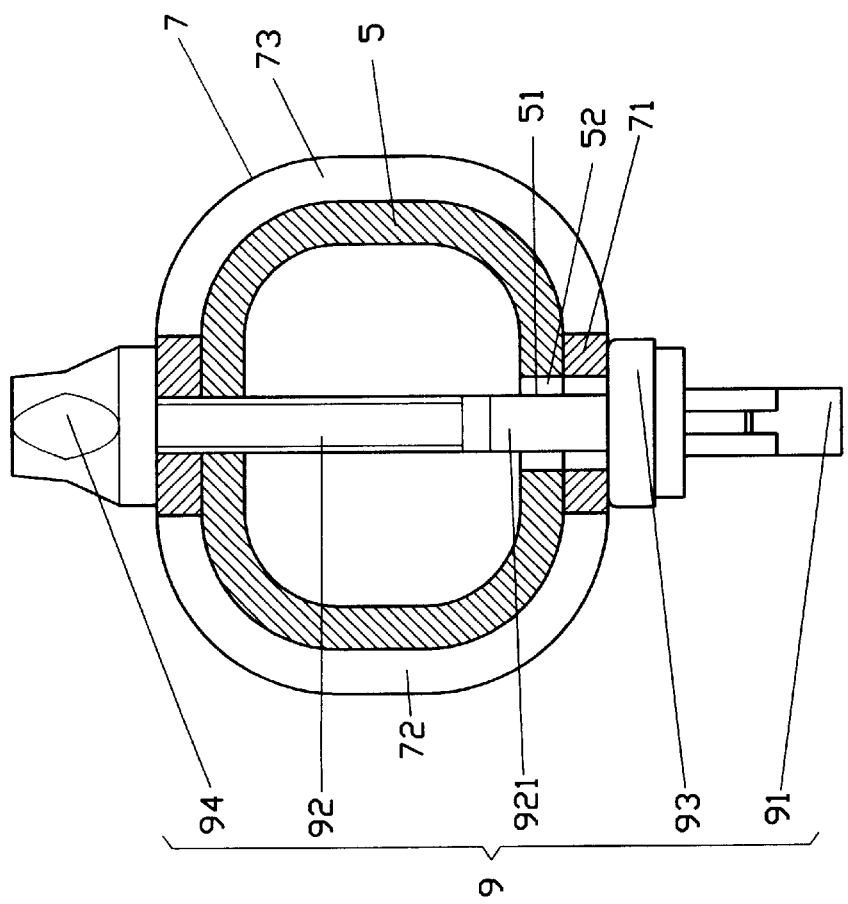
FIG. 6 is a sectional view taken from B—B of the folding knuckle illustrated in FIG. 5.
Figure 7:
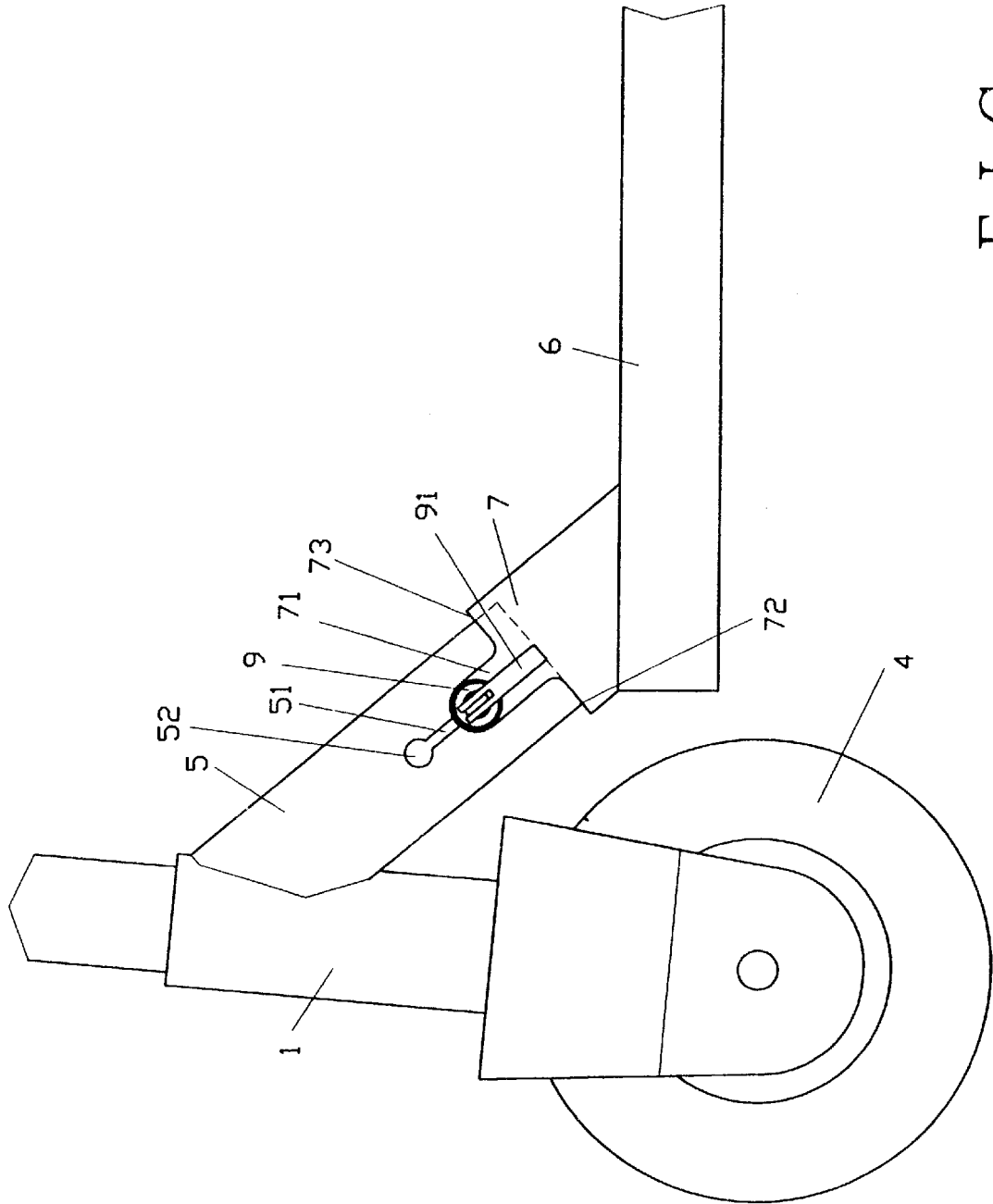
FIG. 7 is a second schematic view showing the action of the folding knuckle of the present invention.
Figure 8:
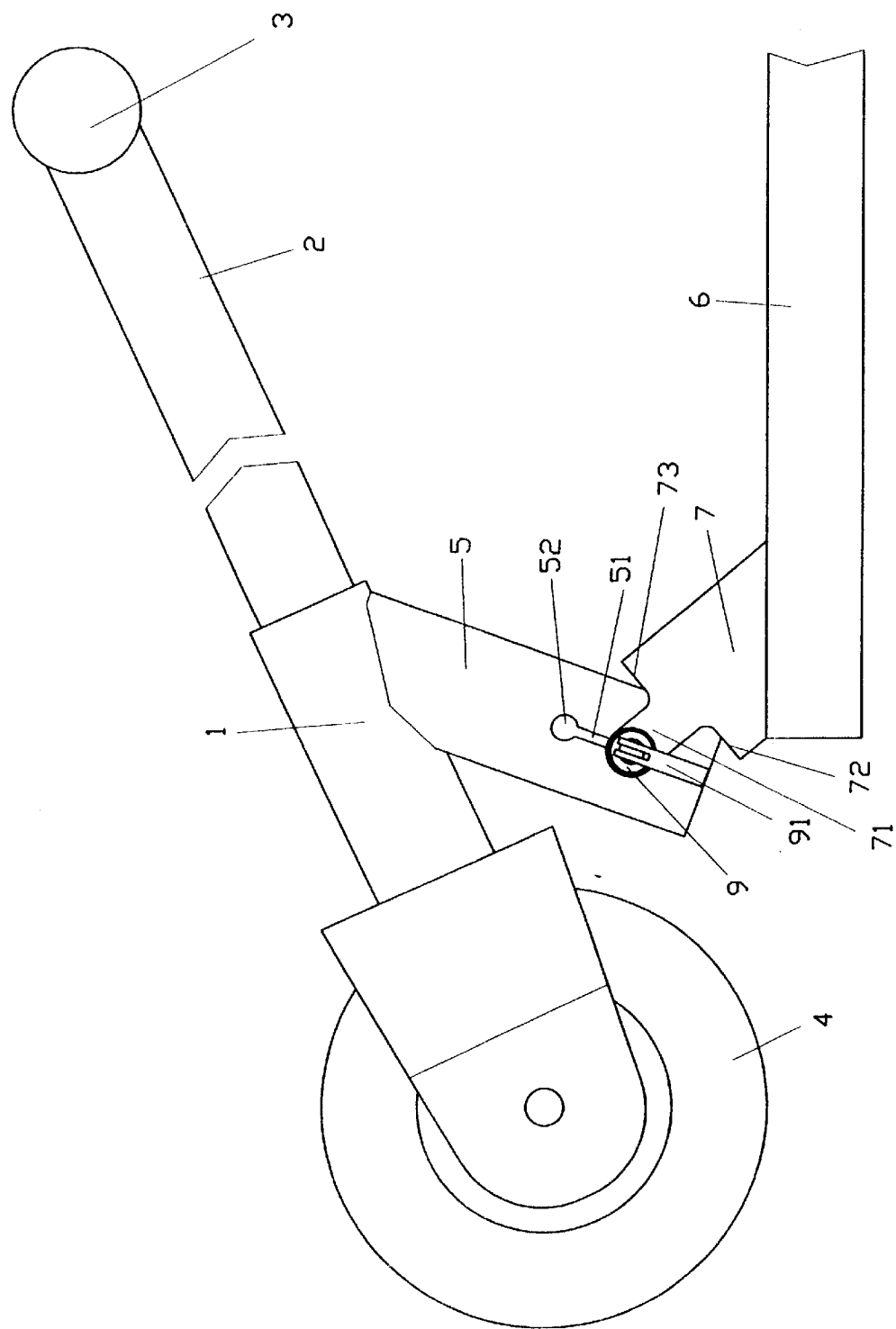
FIG. 8 is a third schematic view showing the action of the folding knuckle of the present invention.
Figure 9:
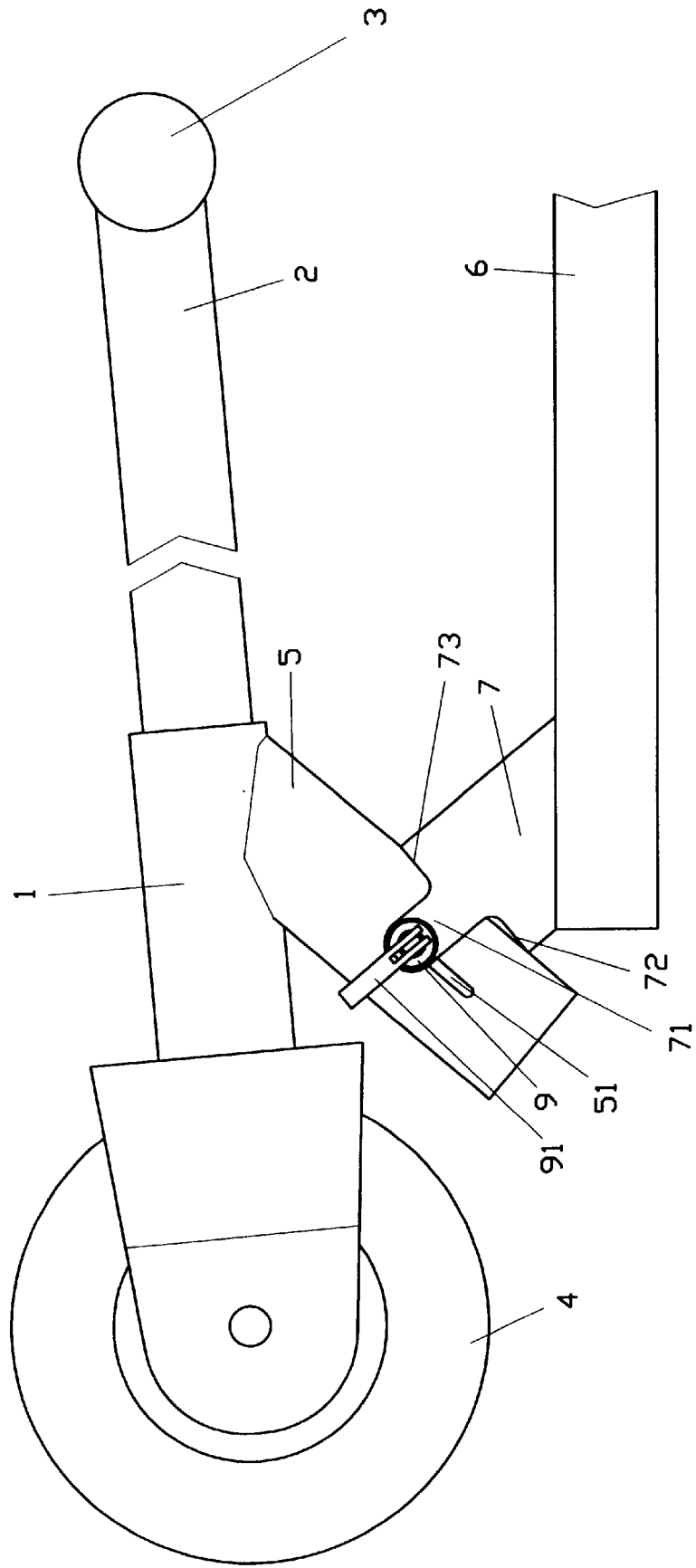
FIG. 9 is a forth schematic view showing the action of the folding knuckle of the present invention.
Figure 10:
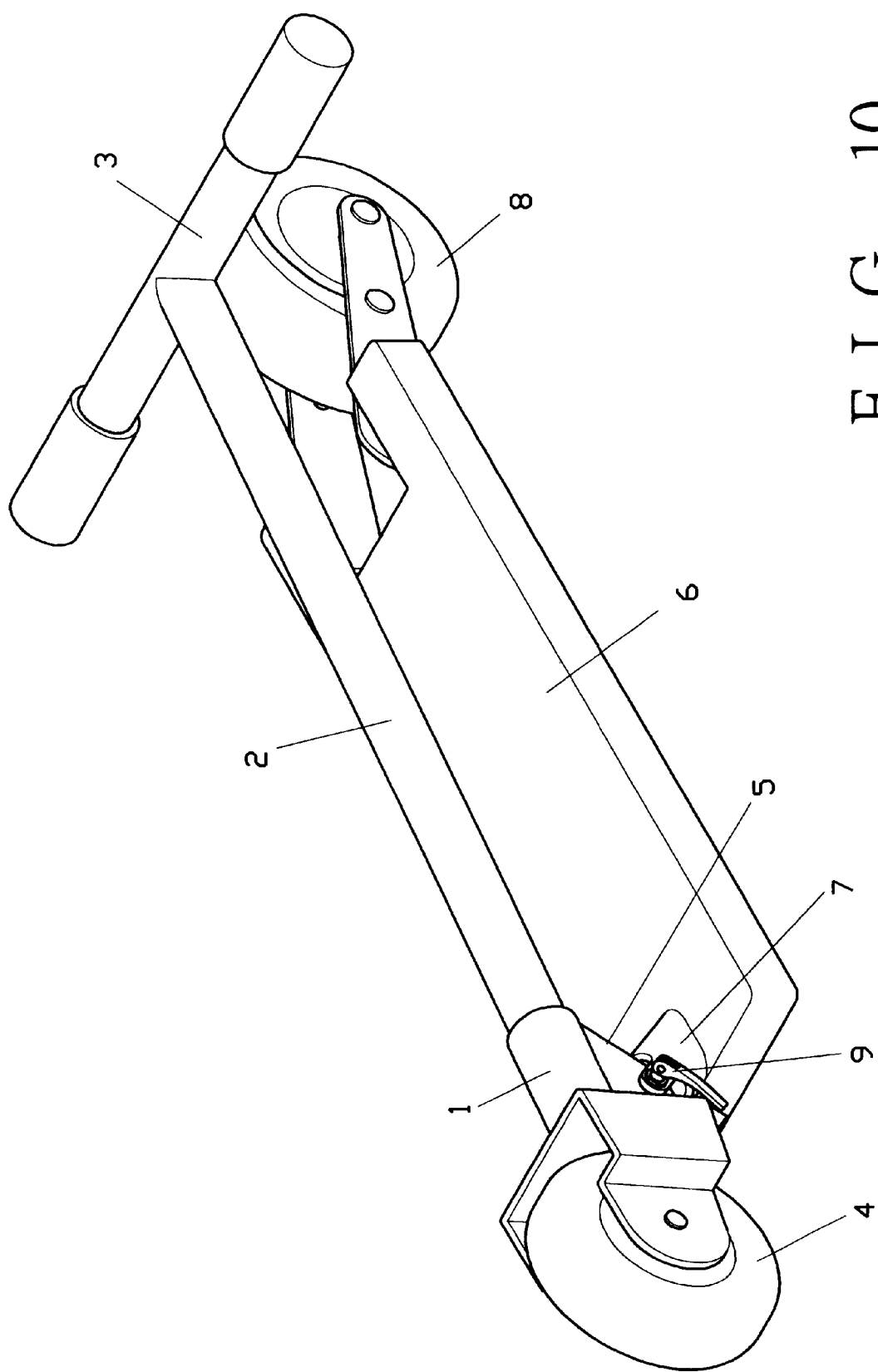
FIG. 10 is a view showing the appearance of the present invention as folded up.

As illustrated in FIGS. 5 and 6 upon removing the structure of the folding knuckle of the present invention to fold up the skating board, the wrench (91) of the joint (9) is loosened up first so that it no longer holds against the tag (71) pressing against the support (5). Then the fixation lever (92) of the joint (9) is turned for returning its flat portion (921) to longitudinal position again so to relatively engage in free slide along the sliding chute (51). Once said support (5) permits to be pulled out upward against the pivot seat (7) to slide to a proper height as shown in FIG. 7, the fixation lever (92) (not illustrated) of the joint (9) forms a turning axial in relation to the tag (71) of the pivot seat (7) to turn the support (5) to incline at a certain angle as illustrated in FIG. 8. The support (5) with its inherited gravity slides downward against the top edge of the pivot seat (7) as shown in FIG. 9 until the fixation lever (92) of the joint (9) holds against the positioning hole (52) (not shown) at the end of the sliding chute (51). At this moment, the circumference of the support (5) holds against the top edge of the lower and the taller walls (72, 73) respectively provided in front and in rear of the pivot seat (7), and is held in position at a certain inclination. As illustrated in FIG. 10, the handle stem (2) connected to the support (5) thus is folded up against the board (6) and holds against the top of the rear wheel (8). Pressing again the wrench (91) of the joint (9) locks up the handle stem (2). The skating board now is folded up and held in position with reduced dimension to facilitate carrying.

Furthermore, both of the positioning hole (52) at the end of the sliding chute (51) of the support (5) and the flat portion (921) of the fixation lever (92) of the joint (9) may be omitted to allow a more convenient folding. That is, upon folding up the skating board, the support (5) is directly pulled up against the pivot seat (7) and turned to a certain inclination using the fixation lever (91) of the joint (9) in relation to the tag (71) of the pivot seat (7) as a turning axis. Then the support (5) slides down against the top edge of the pivot seat (7) to hold against the top edges of the walls (72, 73) in front of and behind the pivot seat (7).

Finally, the joint (9) is used to lock up the support (9).

What is claimed is:

1. A folding structure of a skating board, comprised of a handle stem and a handle both connected to a head tube of the skating board, a front wheel connected to the base of the head tube, a rear wheel connected to the rear end of the board, and a folding knuckle provided between the head tube and the front end of the board, characterized by that:

a support extends at a certain inclination from the peripheral of the head tube, a pivot seat is fixed at the end surface of the front side of the board, and a folding knuckle formed by inserting and pivoting the support to the pivot seat; wherein, a sliding chute in proper length is provided on the surface of the support and a tag extends from the top end of the pivot seat on the board so that the support penetrates at a certain inclination through the pivot seat and is fixed between the tag and the sliding chute with a joint which allows fast release;

the support is inserted and secured to the pivot seat and to achieve double secure in conjunction with the compressed joint; upon folding up, the joint is released to permit the support to be pulled up and slide against the pivot seat, a fixation lever from the joint in relation to the tag from the pivot seat is used as a rotation axis to turn the support for a certain inclination; furthermore, the support slides downward against the top edge of the pivot seat so that the support holds against top edges of front and rear side walls of the pivot seat; thus, the support is locked up by the pressing the joint.

2. A folding structure for a skating board as claimed in claim 1, wherein, a positioning hold is provided at one end of the sliding chute and a portion of the fixation lever of the joint inserted into the sliding chute forms a flat portion which is wider than the sliding chute and slighting smaller than the positioning hole so to change the direction of the flat portion to locate in the positioning hole, and to be held in position against the sliding chute.

\* \* \* \* \*